Nov. 14, 1950 — O. E. EKBLOM — 2,530,049
HOLDER AND PRINTER FOR SALES SLIPS
Filed Feb. 21, 1944 — 3 Sheets-Sheet 1
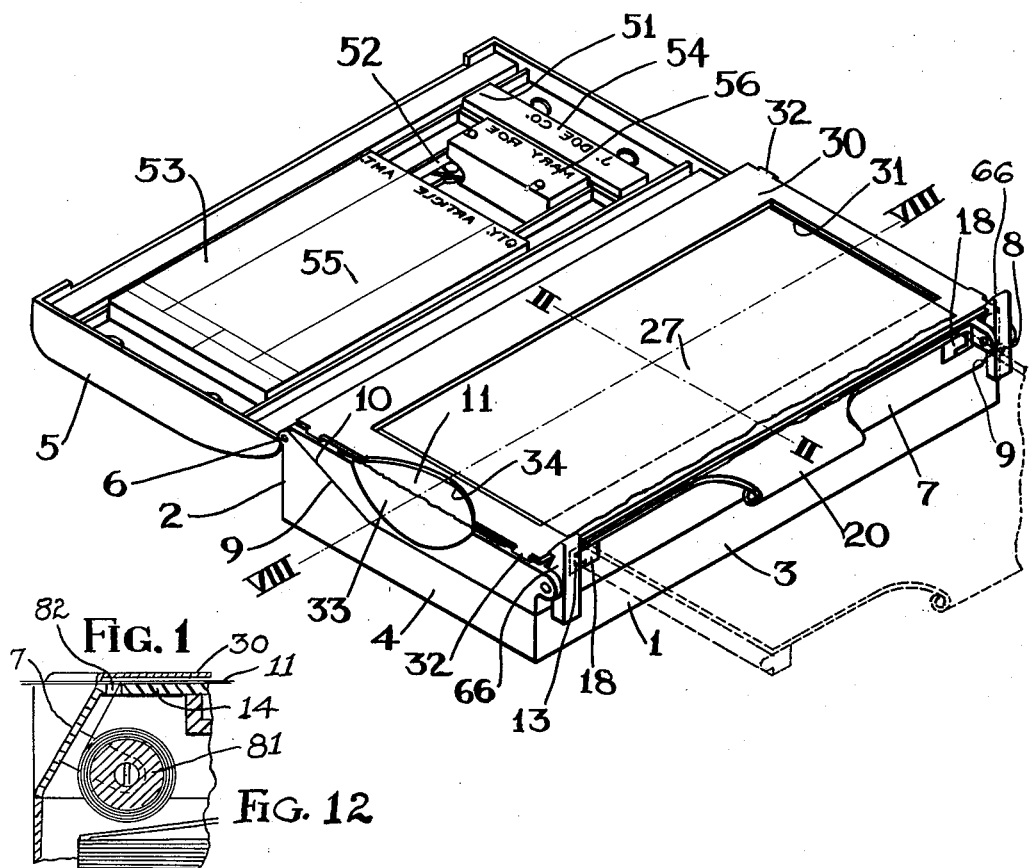
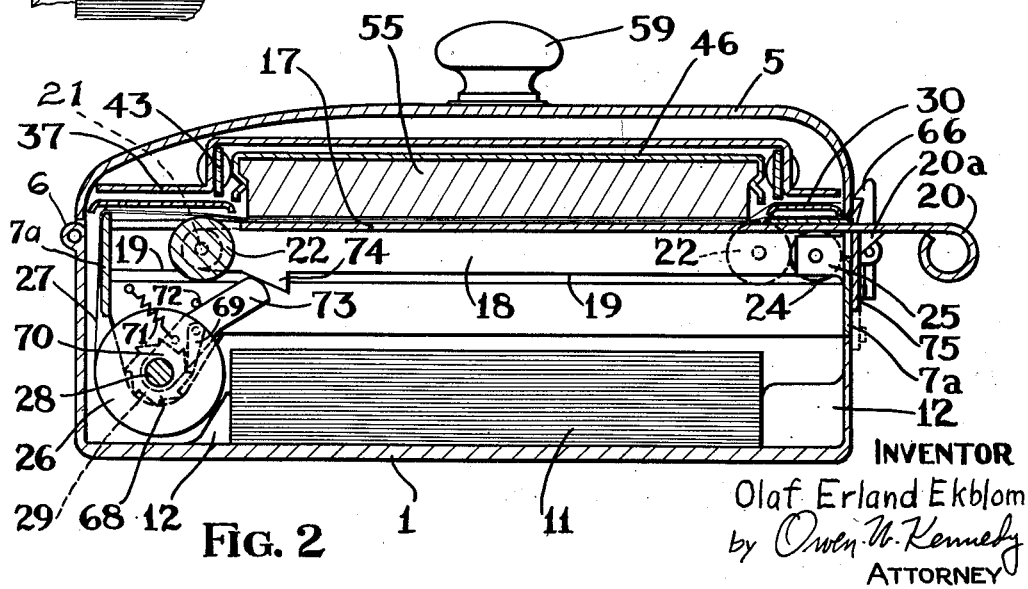
INVENTOR
Olaf Erland Ekblom
by Owen N. Kennedy
ATTORNEY Nov. 14, 1950     O. E. EKBLOM     2,530,049

HOLDER AND PRINTER FOR SALES SLIPS

Filed Feb. 21, 1944     3 Sheets-Sheet 2

INVENTOR
Olaf Erland Ekblom
by Owen W. Kennedy
ATTORNEY

Nov. 14, 1950          O. E. EKBLOM          2,530,049
HOLDER AND PRINTER FOR SALES SLIPS
Filed Feb. 21, 1944          3 Sheets-Sheet 3
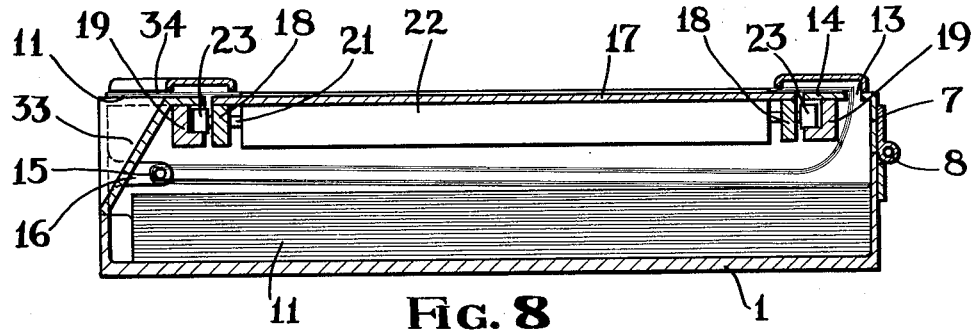
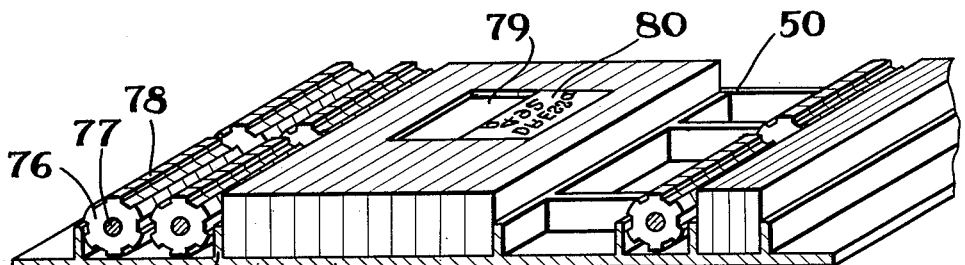
INVENTOR
Olaf Erland Ekblom
by Owen W. Kennedy
ATTORNEY Patented Nov. 14, 1950

2,530,049

UNITED STATES PATENT OFFICE 2,530,049

HOLDER AND PRINTER FOR SALES SLIPS

Olaf Erland Ekblom, Boylston, Mass., assignor, by direct and mesne assignments, of one-half to Joseph A. Dunn, Boston, Mass., and one-half to Katherine M. Hannum, New York, N. Y.

Application February 21, 1944, Serial No. 523,213

12 Claims. (Cl. 101—287)

The present invention relates to a holder for sales slips and particularly to a holder incorporating a mechanism by which the entire sales slip may be printed directly upon a suitable blank drawn from a supply within the holder, together with pertinent data concerning a sales transaction, as well as the name and address of the customer concerned.

In Patent No. 2,290,097, issued to Joseph A. Dunn July 14, 1942, there is shown and described a holder for sales slips incorporating mechanism for transferring, by a printing operation, pertinent data concerning a sales transaction upon previously printed slips of the particular type employed by the merchandising concern. Since such pre-printed slips require accurate registration of the sales information with the lined spaces on the slips, difficulties are encountered should the sales clerk fail to exactly locate the printed slip in the holder for each transaction. Furthermore, large concerns are unable, under the present emergency conditions, to obtain sufficient quantities of printed sales slips to meet advance needs.

According to the present invention there is provided an improved sales slip holder which eliminates all the difficulties arising from the use of pre-printed slips, by providing, in association with the holder, means for printing complete sales slips upon blank forms. Since the various ruled lines defining the entry form spaces of each slip are printed simultaneously with the so-called constant information, such as the sales data, clerk number, or department number, together with the customer's name and address, the question of proper registration of such data with the spaces of the strip does not arise. Therefore, each operation of my improved holder provides a completely printed slib with all customer and constant information thereon, so that the sales clerk can complete the transaction by writing in whatever few additional entries may be necessary to complete the sale.

A further advantageous feature of the invention resides in the employment, in connection with each sales transaction, of an embossed price tag which, upon removal from the article being sold and mounting in the printing chase of the holder, will transfer the item number and style of the article directly to the sales slip, at the time of printing the same. The printing mechanism is also arranged so that the constant information can be varied as regards different store departments and clerk numbers, thereby making it possible for a single holder and its associated mechanism to be conveniently employed by several sales clerks.

The above and other advantageous features of the invention will hereinafter more fully appear from the following description, in connection with the accompanying drawings, in which Fig. 1 is a perspective view of a holder embodying the invention, with the cover open;

Fig. 2 is a transverse sectional view through the holder, with the cover closed, the section being taken along the line 2—2 of Fig. 1;

Fig. 8 is a longitudinal section through the holder base along the line 8—8 of Fig. 1;

Fig. 9 is a view, partially in section and partially in perspective showing a modification in the arrangement of the printing devices associated with the cover;

Figs. 10 and 11 illustrate the appearance of sales slips, as printed by operation of the device;

Fig. 12 is a fragmentary view showing the provision of a storage means in the base for receiving completed slips.

Figure 3:
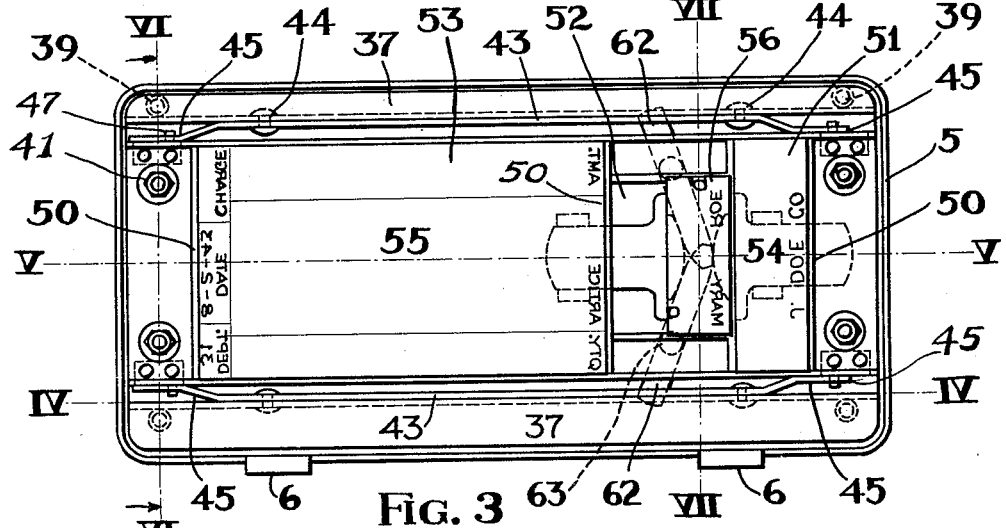
Fig. 3 is a plan view of the cover turned back, as shown in Fig. 1.

Referring first to Figs. 1 and 2, the holder comprises a base 1 of rectangular form, with upwardly projecting side walls 2 and 3 of different height, and end walls 4. A cover 5 is pivotally connected to the upper edge of the higher wall 2 by hinges 6, the cover 5 being shown in the open position in Fig. 1, and in the closed position in Fig. 2, said cover being rectangular in form and rests upon the side and end walls 3 and 4, with one end of the frame 7 being connected by hinge 8 to the right hand end wall 4 of the base, as viewed in Fig. 1. The side wall 3 and the end walls 4 provide inclined surfaces 9 adjacent the hinges 6 and 8, and the frame 7 provides correspondingly inclined surfaces 10 which, when engaged with surfaces 9, serve to firmly hold the frame 7 in alinement with the walls 3 and 4 of the base 1.

As best shown in Figs. 2 and 8, the frame 7 overlies an assembly of blank sales slips 11 which are positioned in the base 1 by means of spaced lugs 12 extending upwardly from the bottom of the base and parallel to the walls 2 and 3. The blank sales slips 11 are preferably of the continuous form type, in which two or more strips of forms are interleaved and then fan-folded, so that several strips may be simultaneously drawn from the assembly through a slot 13 in a top member 14 of the frame 7. For the purpose of guiding the strips of sales slips 11, the base provides a roll 15 supported by brackets 16 at the end of the frame opposite to the slot 13, with the slips 11 passing around the roll 15 and then over the assembly before entering the slot 13.

The frame 7 also serves to support a writing plate 17 which lies in the same plane as the top 14 of the frame, so that sales slips as drawn through the slot 13 will overlie the writing plate 17. The ends of the writing plate 17 provide downwardly extending guide bars 18 which are slidably received in tracks 19 supported from the top 14 of the frame 7, as best shown in Fig. 8. The writing plate 17 provides a handle 20 projecting beyond the wall 7a of the frame, by means of which the plate 17 may be pulled laterally out of the frame 7, as indicated in dotted lines in Fig. 1, for the purpose of performing a printing operation on the blank sales slips 11, as later described.

As best shown in Fig. 2, the guide bars 18 of the writing plate 17 extend beyond the inner edge of the plate and support between them a shaft 21 on which is mounted a pressure roll 22. The roll 22 is preferably formed of yieldable material such as rubber, and is of such diameter as to extend slightly above the plane of the plate 17, for a purpose which will later appear. When the plate 17 is pulled out of the frame 7 by the handle, the ends of the shaft 21 are supported in the tracks 19 by anti-friction bearings 23, the outer races of which roll freely in the tracks 19, so that the upper surface of the roll 22 will always travel in a straight line and will be held in pressure-exerting position with respect to the printing mechanism carried by the cover 5. The lateral movement of the plate 17 with respect to the frame is also expedited by the support of the plate on a roll 24 mounted between the tracks 19, and supported at its ends by lugs 25 projecting inwardly from the wall 7a. When the plate 17 is pulled out of the frame, its travel is limited by the engagement of the pressure roll 22 with the roll 24, with the pressure roll 22 then occupying the dotted line position of Fig. 2.

As previously pointed out, the holder of the present invention contemplates the printing of complete sales slips from blank material, and for this purpose the base 1 also carries a supply 26 of duplicating material in the form of carbon paper 27. This material is provided in the form of a roll mounted on a shaft 28 supported between downwardly extending projections 29 provided at the ends of the frame 7. The roll consists of several sheets or webs of carbon paper 27 wound in overlying relation, with the several sheets being led upwardly over the edge of the side member 7b of the frame 7, and the top of the pressure applying roll 22. The several sheets of carbon are then interleaved with the several sales slips 11 overlying the writing plate 17, with the transfer surfaces of the carbon sheets facing downward. Therefore, the writing plate 17 serves to support an assembly consisting of alternate sales slips 11 and carbon sheets 27, with the top carbon sheet 27 lying uppermost in the assembly, as viewed in Fig. 1.

For the purpose of maintaining the assembly of sales slips 11 and carbon sheets 27 in flat condition on the writing plate 17, the frame 7 further provides a holding plate 30. This plate 30 overlies the entire assembly and provides a rectangular sight 31 cut out of the plate, with the inside dimensions of the sight 31 substantially corresponding to the space in which the printing is to be done on the sales slips.

The holding plate 30 is connected to the top member 14 of the frame, as indicated at 32, so that the plate 30 will remain in place when the cover 5 is turned back, as shown in Fig. 1, to expose the top carbon sheet 27. In this position, the sight 31 in the plate 30 will permit the top carbon sheet to be turned back to expose the uppermost sales slip 11 after the latter has been printed, as later described, for the entry on the sales slip of any information to be written by the sales clerk.

With the holding plate 30 in the position of Fig. 1, the outer edges of the several lower carbon sheets 27 are held flat between the margin of the plate 30 and the underlying writing plate 17. With the edges of the carbon sheets thus held, the completed sales slips 11 can be withdrawn from between the holding plate 30 and the writing plate 17 by seizing the projecting ends of the sales slips and pulling them away from the holder base 1. To facilitate such withdrawal of completed sales slips, the end wall of the frame 7 and the overlying plate 30 are cut out, as indicated at 33 and 34, to permit the fingers to readily grasp the exposed ends of the several sales slips, as shown in Fig. 8.

Figure 4:
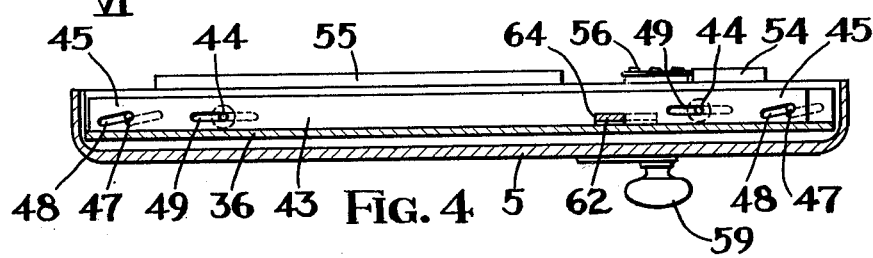
Fig. 4 is a longitudinal sectional view along the line 4—4 of Fig. 3.
Figure 5:
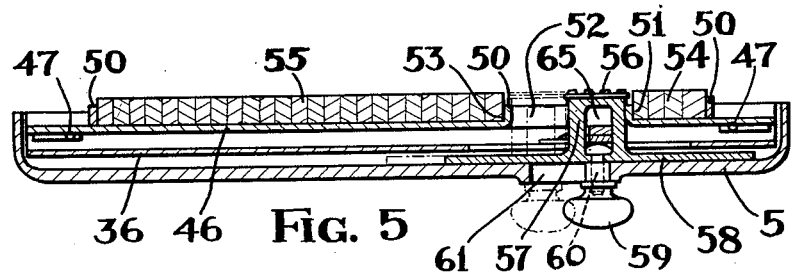
Fig. 5 is a longitudinal sectional view along the line 5—5 of Fig. 3.
Figures 6, 7:
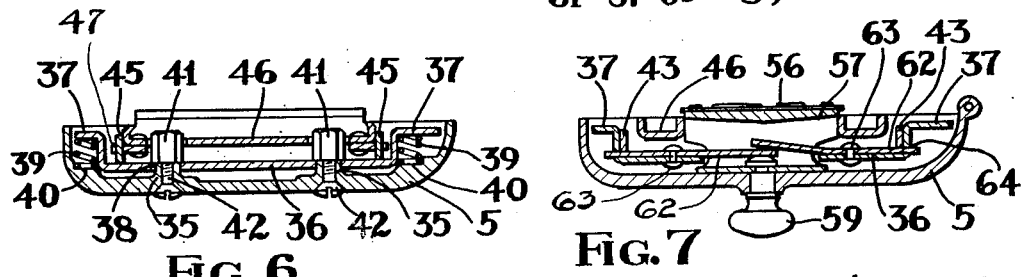
Fig. 6 is a transverse sectional view along the line 6—6 of Fig. 3, looking in the direction of the arrows.
Fig. 7 is a transverse sectional view along the line 7—7 of Fig. 3, with the inclined levers also shown in section.

As previously indicated, the cover 5 is provided with means for printing the sales slips in cooperation with the movable pressure roll 22, and Figs. 3 to 7, inclusive, illustrate in detail the manner of supporting the printing devices within the turned back cover. As best shown in Fig. 6, the cover 5 is in the form of a trough, the bottom of which provides spaced pairs of bosses 35 located near the ends of the trough. These bosses 35 serve to position a printing frame 36 which is of U-shaped cross section and provides longitudinal edge flanges 37 extending parallel to and spaced from the bottom of the cover. The ends of the frame 36 provide openings 38 fitting loosely around the bosses 35 so that the entire frame is movable on the bosses.

The frame 36 is yieldingly supported at its four corners by springs 39 interposed between the side flanges 37 and seats 40 provided by the cover. The pressure of the springs 39 serves to urge the entire frame 36 away from the bottom of the cover 5 into engagement with stops 41 in the form of nuts mounted on studs 42 extending through the several bosses 35. Thus the entire frame 36 is yieldingly maintained in a position in which it is spaced from the cover itself, so that the frame is capable of relative movement with respect to the holder frame 7 when the cover is in its closed position, as shown in Fig. 2.

Referring now to Fig. 3, it will be seen that each flange 37 of the frame is provided with a side bar 43 secured to the flange by rivets 44. The two side bars 43 are coextensive with the flanges 37 for the major portion of their lengths, while each bar 43 being offset at its ends to provide terminal portions 45, appreciably spaced from the parallel sides of the associated frame flange 37. Thus the terminal portions 45 of the two side bars 43 provide between them pairs of oppositely facing surfaces at each end of the frame, which surfaces are offset from the intermediate portions of the bars which are secured to the frame flanges 37.

The above described spacing of the terminal portions 45 of the bars 43 is clearly shown in Fig. 6, and these portions 45 are adapted to support between them a chase or type holder 46 for containing printing devices later to be described in detail. The holder 46 is supported at its four corners by means of projecting pins 47 seated in slots 48 provided by the corresponding terminal portions 45 of the bars 43. As best shown in Fig. 4, the several slots 48 are inclined with respect to the plane of the type holder 46, with the pins 47 being seated in the right hand ends of the slots 48 when the bars 43 occupy their full line position. It is to be noted, however, that the rivets 44 which secure the bars 43 to the flanges 37 of the frame 36 are received in slots 49, so that the bars 43 are movable longitudinally on the frame 36 for a purpose which will next be described with reference to the operation of the printing devices in the type holder 46.

Referring now to Figs. 3 and 5, it will be seen that the type holder 46 is in the form of a plate providing a number of upwardly extending partition walls 50, which divide the holder into a number of type receiving compartments 51, 52 and 53. The compartments 51 and 53 are of such width as to readily receive lines of type 54 and 55, respectively, so formed as to represent the constant information that is to be printed on the sales slips 11, such as the name of the store, department, and general sales data. It is also to be noted that the type 55 in the compartment 53 also provides lining to define blank spaces for the entry of information concerning a sale, as is clearly indicated in Fig. 1, which shows the cover 5 turned back to expose the type 54 and 55 mounted in the holder 46.

The intermediate type compartment 52 is of less width than the other compartments 51 and 53, and is so proportioned as to provide an area substantially twice the area of the usual customer's identification plate employed by mercantile establishments. Such an identification plate is indicated by the reference character 56 in Fig. 1, from which it is evident that the plate 56 can occupy different printing positions within the compartment 52. In order to move the plate 56 from one position to another, the frame 36 provides a plate carrier 57 which, as best shown in Fig. 5, projects into the compartment 52 and provides a surface on which the customer's identification plate 56 may be mounted so as to lie in the same plane as the type 54 and 55.

The carrier 57 provides a base 58 in the form of a plate movable between the bottom of the cover 5 and the frame 36. This plate 58 carries a knob 59 mounted on a stud 60 that is movable in a slot 61 provided by the cover 5, so that by means of pressure applied to the knob 59, the carrier 57 for the customer's identification plate 56 can be shifted from the full to the dotted line position of Fig. 5. The object of shifting the customer's identification plate 56 from one position to another is in order to transfer separate impressions of the embossed lettering thereon to the sales slip in different locations thereof, as illustrated in the showing of the printed sales slip in Fig. 10. Since the first printing of the customer's identification plate 56 occurs simultaneously with the printing of a complete sales slip 11 with the constant information represented by the type 54 and 55, the improved holder provides means for preventing a second impression by the type 54 and 55, after the plate 56 has been moved to its second printing position. To this end, the manual operation of the knob 59 to shift the carrier 57 is utilized to bodily withdraw the holder 46 and thereby carry its type 54 and 55 into a non-printing position.

As previously pointed out, the bars 43 which support the pins 47 in the slots 48 are shiftable longitudinally on the frame 36, which is normally supported by the springs 39 in the position of Fig. 6. The bars 43 are adapted to be shifted lengthwise on the frame 36 by means of a pair of levers 62 mounted on pivots 63 fixed on the frame 36. The outer ends of these levers 62 are seated in notches 64 provided in the lower edges of the bars 43, while the inner ends of the levers 62 are received in a recess 65 provided in the carrier 57, with the opposed ends of the levers 62 being freely movable in the recess 65 when the carrier 57 is shifted from one position to another, as previously described.

With the parts located as shown in Fig. 3, i. e., with the customer's printing plate 56 in its first printing position, the bars 43 will be in the position of Fig. 4, with the pins 47 of the type holder 46 in the upper right hand ends of the inclined slots 48. Therefore, the characters of the type 54 and 55, as well as the characters of the customer's printing plate 56 will all lie in a common plane beyond the edges of the cover 5 and will print on the sales slips simultaneously when the box is operated as later described.

However, should the knob 59 be moved to shift the carrier 57 to the dotted line position of Fig. 5, the movement of the customer's identification plate 56 to its new position will be accompanied by turning of the levers 62 about their fixed pivots 63 into the dotted line position of Fig. 3. When this occurs, the ends of the levers 62 that are seated in the notches 64 will shift the two bars 43 to the right, as viewed in Fig. 4. This shifting movement will in turn cause the inclined notches 48 to exert a camming action on the pins 47, thereby bodily shifting the entire type holder 46, with respect to the customer's identification plate 56. The shifting of the bars 43 is indicated in dotted lines in Fig. 4, from which it is evident that the pins 47 will then occupy the lower left hand ends of the slots 48, with the type 54 and 55 then being moved below the plane of the customer's plate 56. Upon return of the knob 59 to the full line position of Fig. 5, the camming action between the pins 47 and slots 48 will serve to reposition the type 54 and 55 in the plane of printing by the customer's identification plate 56.

Having described the construction and the relation between the various parts entering into the holder, the operation of the holder to produce completely printed sales slips will next be considered. Assuming that the holder has been loaded with blank sales slips 11 interleaved with carbon sheets 27, the first step in using the holder resides in turning back the cover 5 as shown in Fig. 1 to expose the type holder 46. The sales clerk then takes the customer's identification plate 56 and affixes it to the carrier 57, then occupying the position of Fig. 3, after which the cover is closed and secured by a suitable locking device 66.

The closing of the cover 5 serves to position the raised characters of the type 54, 55 and the plate 56 within the sight 31 of the plate 30, in readiness to perform the first printing operation, the parts then occupying the position of Fig. 2. The sales clerk then seizes the handle 20 and pulls the writing plate 17 outwardly to the dotted line position of Fig. 1, whereupon the pressure roll 22 will progressively press the interleaved assembly of sales slips 11 and carbon sheets 27 firmly against the type within the holder 46. As the roll 22 moves from the full to the dotted line position of Fig. 2, the frame 36 carrying the type holder will yield slightly against the pressure of the springs 39, so that a uniform printing pressure is maintained and several clear impressions of all of the sales slip data represented by the type 54 and 55 will be produced with the printing of the identification plate 56.

Still keeping the cover locked, the clerk then moves the knob 59 to shift the customer's identification plate to its other position, followed by pressure on the handle 20 to return the writing plate 17 to its original position. Since the movement of the knob 59 serves to shift the type 54 and 55 away from the plane of printing, the pushing in of the writing plate 17 causes the returning roll 22 to make only a single impression from the customer's identification plate 56 in its second position. In other words, the removal of the type 54 and 55 from the plane of printing prevents a second impression thereof on the already printed sales slips, thereby conserving the carbon and preventing any blurring such as might occur from a second impression.

The sales clerk then unlocks the cover 5 and turns it back to the position of Fig. 1, after which the uppermost carbon sheet may be turned back above the plate to expose the top printed sales slip which then has the appearance of Fig. 10, with all the constant information and form spaces printed thereon, together with two separate impressions of the customer's identification plate. Since the several printed sales slips are then supported by the writing plate 17, with the carbons interleaved below the top slip, the clerk may then make on the top slip whatever additional entries which are required to complete the sales transaction, such as the price of the article being sold, such entries being transferred by the carbon sheets 27 to the slips below, which are in complete register with the top slip. The customer may at this time also sign the top sales slip, thereby reproducing the customer's signature on the underlying slips.

The transaction having been completed, the plate 30 is now ready to hold all of the carbon sheets 27 in position in the assembly. Since the carbons are only as wide as the pressure roll 22, see Fig. 8, the exposed ends of a set of completed slips 11 are seized by the fingers at the cutouts 33 and 34 and pulled out, thereby bringing a fresh set of blank slips in position for the next transaction. As indicated in Fig. 10, the sales slips are provided with perforations 67 between successive slips, so that a completed series of slips may be readily torn off by pulling against the edge of the plate 30. Should it be desired to use blank sales slip material without perforations, obviously the edge of the plate 30 can be utilized for tearing off a set of completed slips after they have been withdrawn from between the carbons.

In order to provide for bringing fresh portions of the carbon sheets 27 into position after the box has been operated a number of times, the shaft 28 carrying the carbon roll provides a feed attachment which can be operated at the option of the sales clerk. As best shown in Fig. 2, the shaft 28 provides a toothed ratchet wheel 68 which is adapted to be engaged by a pawl 69, pivotally mounted on an arm 70 turnable freely about the shaft 28. A spring 71 holds the arm 70 against a stop 72, with the pawl engaged in one ratchet tooth. The arm 70 provides an upwardly extending operating portion 73 which terminates just short of a cam lug 74 provided on one of the bars 18 of the writing plate 17.

Normally the lug 74 is out of engagement with the operating portion 73 of the pawl arm 70, with the parts occupying the position of Fig. 2. This is due to the fact that with the handle 20 pushed in, a lug 20a thereon engages a stop 75 on the side wall 7a of the frame 1, with the stop 75 serving to limit inward movement of the writing plate 17. However, should the operator desire to bring fresh portions of carbon paper into position between the sales slips, it is only necessary to move the stop 75 to its lower position, indicated in dotted lines in Fig. 2. The handle 20 may then be pressed in further to cause the lug 74 to engage the operating portion 73 of the pawl arm, thereby turning the carbon roll through the displacement of one ratchet tooth. Obviously, repeated back and forth movements of the handle with the stop 75 in its lower position will result in feeding sufficient carbon so that the edges of the sheets may be seized and pulled out from beneath the plate 30. The right hand edge of the plate 30 provides a convenient way of tearing off the used carbon sheets that have been fed by the ratcheting device. The stop 75 may then be returned to its upper position which it normally occupies, so that the cam lug 74 on the bar 18 will not operate the ratcheting device. After each operation of the pawl arm 70, the spring 71 will advance the pawl 69 on the ratchet wheel 68 on the next pull-out of the writing plate 17 by the handle 20, so that if desired the sales clerk can cause the carbon to be fed for each operation of the holder by merely leaving the stop 75 in its lower position.

Referring now to Fig. 9, there is shown a modification in the arrangement of the type within the holder, whereby certain portions of the constant information can be varied without disturbing the general arrangement of the remaining type. To this end, the holder 46a provides an extra wall 50a in its main compartment 53a for receiving a number of printing wheels 76 turnable on shafts 77 extending transversely of the compartment. Each printing wheel 76 provides a series of different characters 78 extending radially, so that different characters 78 may be caused to print on the sales slips in accordance with the particular setting of each wheel 76 on its shaft 77.

With the modified form of type holder 46a, it would be possible to utilize one holder to print sales slips for different departments, or for different sales clerks in the same department according to the particular arrangement on the selective characters 78 of the printing wheels 76. The particular printing wheel for recording the sales number could readily be adapted to be automatically turned through one digit each time that the type holder 46a is retracted to render the type inoperative on the return movement of the writing plate 17, as previously described.

The type holder 46a provides one further modification which makes it possible to employ embossed price tags in connection with the recording of the sales of various articles by my improved holder. For this purpose, the holder 46a provides a block 79 fixed with respect to the type 55 that defines the lined spaces on the sales slips. The block 79 provides a surface lying in the same plane as the top of the carrier 75 for the customer's identification plate. An embossed price tag 80 carrying the name and serial number of the article being sold can be mounted on the block 79, which is wide enough to receive several such embossed tags 80. With one or more embossed price tags 80 mounted on the block 79, operation of the pressure roll 22, as previously described, will cause an imprint of the tag or tags 80 to be made on the sales slips simultaneously with the printing thereof. Fig. 11 shows a completed sales slip carrying impressions made by the printing wheels and the embossed price tags 80.

From the foregoing, it is apparent that by the present invention there is provided an improved holder and printer for sales slips, characterized by its ability to print duplicate copies of complete sales slips upon blank forms, simultaneously with constant information concerning the sale, and the customer's name and address, in advance of the entry of the final sales data by the sales clerk. The improved holder also contemplates the provision of means within the base for storing at least one copy of all slips after the entry of the final data thereon. To this end, the frame 7 carries a roll 81 adjacent a slot 82 in the top 14 of the frame, as shown in Fig. 12. Upon this roll 81 the lowermost sales slips 11a may be wound in continuous form, as the sales slips above are removed from the holder, as previously described. Then when the supply of blank slips is exhausted, the roll 81 will carry a complete record of all sales transactions of that series.

I claim:

1. A holder for sales slips comprising, in combination, a hollow base adapted for the storage of duplication sheets and blank sales slips in an interleaved assembly, a writing plate slidably mounted on said base and over the stored sheets and slips so as to be shiftable back and forth thereby to cover and uncover said hollow base, means for guiding the free end portions of the sheets and slips so that they may be manually drawn from the bottom of said base and over the top surface of said writing plate, a cover attached to said base, a type holder carried by said cover for presenting type to the sheets and slips when the cover is closed with said type substantially embracing the area of a slip, and a pressure-exerting means attached to said writing plate so as to press the sheets and slips against the type whenever said writing plate is shifted so as to uncover said base and thereby produce complete sales forms on said slips.

2. A holder for sales slips comprising, in combination, a hollow base adapted for the storage of duplication sheets and blank sales slips, a writing plate slidably mounted on said base and over the stored sheets and slips so as to be shiftable back and forth thereby to cover and uncover said hollow base, separate means for guiding the free end portions of the sheets and slips, respectively, at right angles to each other so that they may be manually drawn from the bottom of said base and over the top surface of said writing plate as an interleaved assembly, a cover attached to said base, a type holder carried by said cover for presenting the type to the assembly of sheets and slips when the cover is closed, and a pressure-exerting means attached to said writing plate so as to press the sheets and slips against the type whenever said writing plate is shifted so as to uncover said base.

3. A holder for sales slips comprising, in combination, a hollow base adapted for the storage of duplication sheets and blank sales slips, a cover pivotally attached to said base, a writing plate over which the sheets and slips are adapted to be drawn, said writing plate being slidably carried by said base between said base and said cover so that it may be partially withdrawn from between said base and said cover while said latter two elements are in a closed condition, a type holder carried by said cover for presenting the type to the sheets and slips when the cover is closed, a pressure-exerting means attached to said writing plate so as to press the sheets and slips against the type whenever said writing plate is partially withdrawn from between said base and said cover, and means for shifting said type holder into a non-operating position with respect to said pressure-exerting means while said cover is closed.

4. A holder for sales slips comprising, in combination, a hollow base adapted for the storage of duplication sheets and blank sales slips, a writing plate carried by and slidably mounted over the upper portion of said base, a cover pivotally attached to said base, a type holder carried by said cover for presenting the type adjacent to said writing plate when said cover is closed, means carried by said base for guiding the free end portions of said sheets and slips across the top portion of said base between said writing plate and said type, a pressure-exerting means attached to one side of said writing plate so as to press the sheets and slips against the type whenever said writing plate is withdrawn from between said cover and said base, and means for shifting said type holder into a non-operating position with respect to said pressure-exerting means while said cover is closed.

5. A holder for sales slips comprising, in combination, a hollow base adapted for the storage of duplication sheets and blank sales slips, a writing plate carried by and slidably mounted over the upper portions of said base, a cover pivotally attached to said base, a type holder carried by said cover for presenting the type adjacent to said writing plate when said cover is closed, separate means carried by said base for guiding the free end portions of said sheets and slips respectively about two different and angularly disposed edge portions of said writing plate and over the top surface thereof between said type and said plate, a pressure-exerting roll attached to one side of said writing plate, guiding means for directing said roll against the sheets and slips and towards said type as said plate is withdrawn from between said cover and base, and means for shifting said type holder into a non-operating position with respect to said pressure-exerting roll while said cover is closed.

6. A salesbook holder comprising, in combination, a hollow box-like base in which the salesbook is positioned, a writing plate mounted upon said base and over which the sales slips are drawn from within the box, a cover attached to said box, type-holding means carried by said cover, manually operable pressure-exerting means attached to the writing plate for pressing said sales slips against said type, and manually operable means movable with respect to said cover for shifting said type away from said base thereby to locate said type beyond the effective range of said pressure-exerting means when said cover is closed.

7. A salesbook holder comprising, in combination, a hollow box-like base in which the salesbook is positioned, a writing plate mounted upon said base and over which the sales slips are drawn from within the box, a cover attached to said box, type-holding means carried by said cover, spring means to bias said type normally towards said writing plate whenever said cover is closed, manually operable pressure-exerting means attached to the writing plate for pressing said sales slips against said spring-biased type, and manually operable means movable with respect to said cover for shifting said type against the action of said spring means thereby to locate said type beyond the effective range of said pressure-exerting means.

8. A salesbook holder comprising, in combination, a hollow box-like base in which the salesbook is positioned, a writing plate slidingly mounted over said base, means for guiding the free end portions of said sales slips over the top surface of said writing plate, a cover attached to said box, type-holding means carried by said cover, spring means to bias said type normally towards said writing plate whenever said cover is closed, means including a roller attached to one side of said writing plate for pressing the sales slips against said spring-biased type in response to a sliding movement of said writing plate, and means associated with said cover for shifting said type against the action of said spring means thereby to locate said type beyond the effective range of said roller.

9. A holder for sales slips comprising, in combination, a hollow base adapted for the storage of duplication sheets and blank sales slips, a writing plate slidably mounted on said base and over the stored sheets and slips so as to be shiftable back and forth thereby to cover and uncover said hollow base, means for guiding the free end portions of the sheets and slips so that they may be manually drawn from the bottom of said base and over the top surface of said writing plate, a cover attached to said base, a type holder carried by said cover for presenting the type to the sheets and slips when the cover is closed, a pressure-exerting means attached to said writing plate so as to press the sheets and slips against the type whenever said writing plate is shifted so as to uncover said base, and means within said base and operable in response to the movements of said writing plate for feeding said sheets from said base to said writing plate.

10. A holder for sales slips comprising, in combination, a hollow base adapted for the storage of duplication sheets and blank sales slips, a cover pivotally attached to said base, a writing plate slidably carried by said base between said base and said cover so that it may be partially withdrawn from between said base and said cover while said latter two elements are in a closed condition, separate means carried by said base for guiding the free end portions of said sheets and slips respectively about two different and angularly disposed edge portions of said writing plate and over the top surface thereof, a type holder carried by said cover, spring means to bias said type normally towards said writing plate whenever said cover is closed, pressure-exerting means attached to said writing plate so as to press the sheets and slips against the type whenever said writing plate is partially withdrawn from between said base and said cover, and means associated with said cover for shifting said type holder against the action of said spring means thereby to locate said type beyond the effective range of said pressure-exerting means.

11. A salesbook holder comprising, in combination, a hollow box-like base in which the salesbook is positioned, a writing plate mounted upon said base and over which the sales slips are drawn from within the box, a cover attached to said box, means carried by said cover for detachably receiving a token having printing characters, type-holding means carried by said cover, manually operable pressure-exerting means attached to the writing plate for pressing said sales slips against said token and said type, and manually operable means movable with respect to said cover for shifting said type away from said base thereby to locate said type beyond the effective range of said pressure-exerting means when said cover is closed.

12. A holder for sales slips comprising, in combination, a hollow base adapted for the storage of duplication sheets and blank sales slips, a cover pivotally attached to said base, a writing plate slidably carried by said base substantially between said base and said cover so that it may be partially withdrawn from between said base and said cover while said latter two elements are in a closed condition, separate means carried by said base for guiding the free end portions of said sheets and slips respectively about two different and angularly disposed edge portions of said writing plate and over the top surface thereof, an apertured plate carried by said base and disposed over said writing plate so as to retain said sheets and slips in a flat relation upon said writing plate, a type holder carried by said cover, and pressure-exerting means attached to said writing plate beneath said holding plate so as to press the sheets and slips through said holding plate aperture and against the type whenever said writing plate is partially withdrawn from between said base and said cover.

OLAF ERLAND EKBLOM.

REFERENCES CITED

The following references are of record in the file of this patent:

UNITED STATES PATENTS

| Number | Name | Date |
|---|---|---|
| 1,658,127 | Johnston | Feb. 7, 1928 |
| 2,026,115 | Anthony | Dec. 31, 1935 |
| 2,092,026 | Schaefer | Sept. 27, 1937 |
| 2,102,787 | Christenson | Dec. 21, 1937 |